M. M. MERRITT.
ELECTROLYTIC PROCESS, PRODUCT, AND APPARATUS.
APPLICATION FILED AUG. 2, 1918.

1,381,883.

Patented June 14, 1921.
2 SHEETS—SHEET 1.

Inventor:
Matthew M. Merritt,
by Emery Booth Janney & Varney
Attys.

M. M. MERRITT.
ELECTROLYTIC PROCESS, PRODUCT, AND APPARATUS.
APPLICATION FILED AUG. 2, 1918.

1,381,883.

Patented June 14, 1921.
2 SHEETS—SHEET 2.

Inventor:
Matthew M. Merritt,
by Emery Booth Janney & Varney
Attys.

UNITED STATES PATENT OFFICE.

MATTHEW M. MERRITT, OF SOUTH MIDDLETON, MASSACHUSETTS, ASSIGNOR TO COPPER PRODUCTS COMPANY, OF BOSTON, MASSACHUSETTS, A CORPORATION OF MAINE.

ELECTROLYTIC PROCESS, PRODUCT, AND APPARATUS.

1,381,883. Specification of Letters Patent. Patented June 14, 1921.

Application filed August 2, 1918. Serial No. 247,962.

*To all whom it may concern:*

Be it known that I, MATTHEW M. MERRITT, a citizen of the United States, and a resident of South Middleton, county of Essex, Commonwealth of Massachusetts, have invented an Improvement in Electrolytic Processes, Products, and Apparatus, of which the following description, in connection with the accompanying drawings, is a specification, like characters on the drawings representing like parts.

This invention pertains to improvements in electrolytic processes, products and apparatus, and more particularly to the manufacture of wire or the like by electrolysis.

In the drawings, which show a preferred form of apparatus for use in connection with the manufacture of my improved wire and method of making the same:

Figure 1:
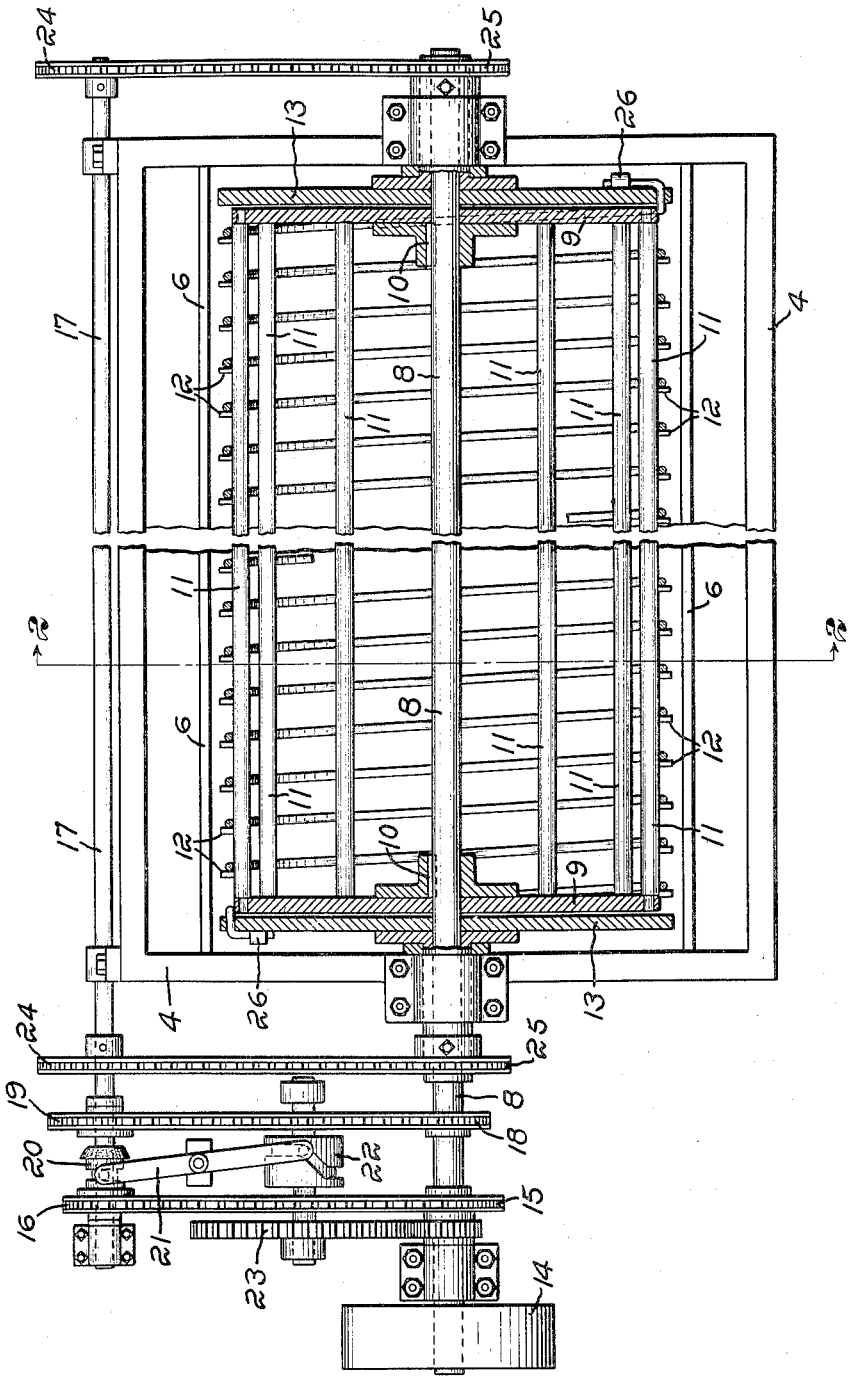
Figure 1 is a plan of a preferred form of electrolytic apparatus.
Figure 2:
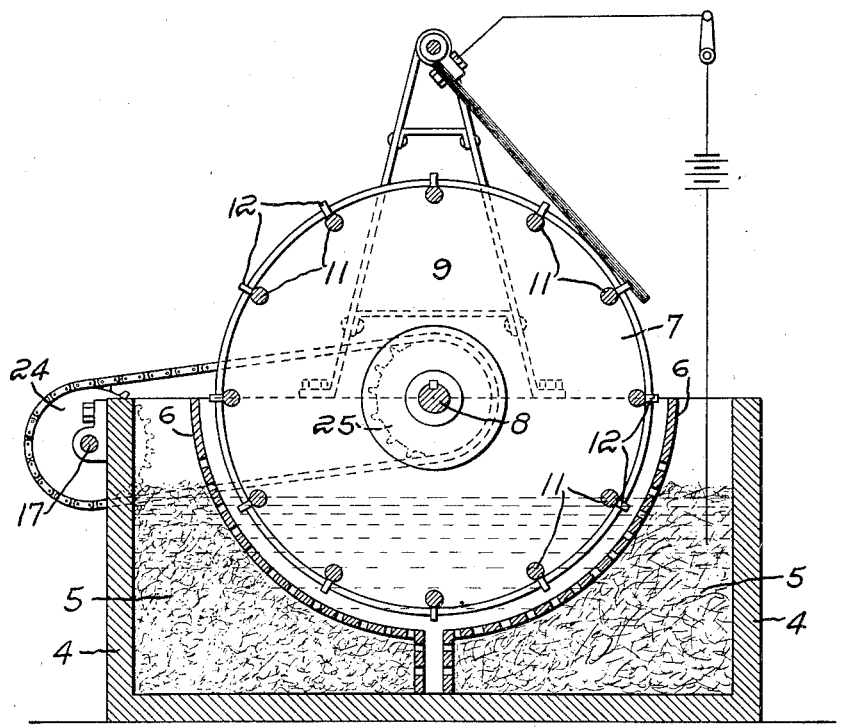
Fig. 2 is a sectional view thereof on the line 2—2 of Fig. 1.
Figure 3:
Fig. 3 is an enlarged section through a novel form of wire which I prefer to make by my improved method and apparatus.

Referring to the drawings, I have shown in Fig. 1 a tank 4 for containing the electrolyte, and cathode material 5 preferably retained behind screens 6 out of contact with the periphery of a rotating reel 7 carried by a shaft 8. The reel 7 preferably comprises two heads 9—9 keyed at 10—10 to the shaft 8 and carrying between them crossbars 11, which preferably carry spaces or dividing portions, herein shown as pins 12. Exterior to the heads 9—9 I preferably provide terminal heads 13—13 carried on the shaft 8, but adapted to be driven at a different number of revolutions per minute from that shaft and from the heads 9—9 carried thereby. In the preferred form of my invention I secure this different speed and impaired rotary power to the parts by driving the shaft 8 by a pulley 14 having keyed thereto a sprocket 15 driving a sprocket 16 on a countershaft 17 and a second sprocket 18 on the shaft 8 driving a sprocket 19 on the countershaft 17. The sprocket 15 may contain one more tooth than the sprocket 16, while the sprocket 18 contains one less tooth than the sprocket 19, so that when the sprocket 16 is driving the shaft 17, the said shaft will rotate at a speed slightly greater than when said shaft is driven by the sprocket 19. I preferably provide for alternate engagement of the sprockets 16 and 19 with the shaft 17 by a clutch mechanism 20 adapted to be rocked by a lever 21 controlled by a cam 22 receiving rotation from the shaft 8 through any suitable reducing mechanism 23. The shaft 17 preferably carries sprockets 24—24 driving respectively sprockets 25—25 secured to the hubs of the outer heads 13—13. Therefore the outer heads 13—13 will alternately be driven a little faster and a little slower than the inner heads 9—9.

My improved wire is preferably made by electro-deposition on the exterior of an iron or steel wire of smaller gage than that desired for the final product, and the opposite ends of the initial wire, which I may term the matrix wire, are secured at 26—26 to the outer heads 13—13, the intermediate portion of said wire being loosely wound about the reel formed between the inner heads 9—9. The convolutions of wire loosely rest against the crossbars 11, and are separated by the spacing elements 12.

The entire reel mechanism is preferably immersed about one-third in the electrolyte, and is preferably rotated constantly in one direction. The preferred form of reel, by reason of the varying speed of rotation of the heads 9—9 and 13—13, does not at any time leave the crossbars 11 in contact with any given portion of the convolutions of wire, the point of contact of any given crossbar with an adjacent portion of wire being constantly varied as the reel and crossbars included therein rotate forwardly and backwardly relative to the heads 13—13 which rotate at a varying speed. This prevents impairment of the wire at the point where it is supported on the reel.

The preferred form of wire is advantageous in that it possesses the inherent strength of the steel and the great conductivity and resistance to corrosion of the exterior surface, which is preferably of copper. In many cases, copper wire of larger gage than is necessary to secure the desired conductivity is utilized for electric transmission, because it is desired to secure greater structural strength than that which would be provided by a copper wire of the proper diameter for the desired conductivity. My composite wire is much stronger for a given diameter than a wire made entirely of copper. It is also cheaper than copper wire of similar diameter made by the usual drawing operation.

Claims:

1. Electrolytic apparatus for use in depositing metal on a flexible cathode comprising, in combination, a reel on which a flexible cathode may be wound, said reel providing means to which the ends of said cathode may be secured, and bars for supporting the intermediate portion of said cathode and differential speed driving means for driving said bars and said means to which the ends of said cathode may be secured at different rates, thereby to vary the points of contact of said flexible cathode on said bars.

2. Electrolytic apparatus comprising, in combination, a shaft, a reel portion secured to said shaft, another reel portion carried by said shaft but rotatable relative thereto, driving means for turning said shaft and said first-named reel portion and supplemental driving means for driving said last-named reel portion at a different speed from that of the first-named reel portion.

3. Electrolytic apparatus comprising, in combination, a shaft, a reel portion secured to said shaft, another reel portion carried by said shaft but rotatable relative thereto, driving means for turning said shaft and said first-named reel portion and supplemental driving means for driving said last-named reel portion alternately at a rate greater than that of the first-named reel portion and at a rate less than that of the said first-named reel portion.

4. Electrolytic apparatus comprising, in combination, a shaft, a reel portion secured to said shaft, another reel portion carried by said shaft but rotatable relative thereto, driving means for turning said shaft and said first-named reel portion and supplemental driving means for driving said last-named reel portion alternately at a rate slightly greater than that of the first-named reel portion and at a rate slightly less than that of the said first-named reel portion.

In testimony whereof, I have signed my name to this specification.

MATTHEW M. MERRITT.